United States Patent

Moss et al.

[11] Patent Number: 5,653,882
[45] Date of Patent: Aug. 5, 1997

[54] ASYMMETRIC MEMBRANES OF POLYTETRAFLUOROETHYLENE AND PROCESS FOR MAKING THEM

[75] Inventors: Arthur Zenker Moss; Martin Gerald Wagner; Raymond Richard Zolandz, all of Wilmington, Del.

[73] Assignee: E. I. Du Pont de Nemours and Company, Wilmington, Del.

[21] Appl. No.: 440,608

[22] Filed: May 15, 1995

Related U.S. Application Data

[63] Continuation-in-part of Ser. No. 93,233, Jul. 16, 1993, abandoned.

[51] Int. Cl.$^6$ .............................. B01D 29/05; B01D 71/26
[52] U.S. Cl. .............................. 210/490; 96/4; 210/500.36; 264/41; 427/245
[58] Field of Search .............................. 210/505, 500.36, 210/490, 500.27; 264/41, 49; 96/4; 427/245, 246

[56] References Cited

U.S. PATENT DOCUMENTS

| | | | |
|---|---|---|---|
| 3,664,915 | 5/1972 | Gore | 161/164 |
| 3,953,566 | 4/1976 | Gore | 264/288 |
| 3,962,153 | 6/1976 | Gore | 260/2.5 R |
| 4,187,390 | 2/1980 | Gore | 174/102 R |
| 4,247,498 | 1/1981 | Castro | 264/41 |
| 4,248,924 | 2/1981 | Okita | 428/212 |
| 4,374,891 | 2/1983 | Ward, III | 428/220 |
| 4,414,280 | 11/1983 | Silva et al. | 427/245 |
| 4,619,897 | 10/1986 | Hato et al. | 435/182 |
| 4,784,880 | 11/1988 | Coplan et al. | 427/245 |
| 4,863,604 | 9/1989 | Lo et al. | 210/490 |
| 4,889,626 | 12/1989 | Browne | 210/359 |
| 4,964,992 | 10/1990 | Goldsmith et al. | 210/500.36 |
| 5,273,694 | 12/1993 | Perusich et al. | 264/41 |
| 5,328,946 | 7/1994 | Tuminello et al. | 524/462 |

OTHER PUBLICATIONS

Vigo, F. et al, *J. Appl. Poly. Sci.* 21, 3269–3290 (1977).
Munari, S. et al, *J. Appl. Poly. Sci.*, 20, 243–253 (1976).
Tancrede, P. et al, *J. Biochem. Biophys. Meth.*, 7, 299–310 (1983).
West, R. et al, *Proc.–Inst. Environ. Sci.*, 37 Ed., pp. 841–848 (1991).
Hiatt, W.C. et al, "Microporous Membranes via Upper Critical Temperature Phase Separation", *Materials Science of Synthetic Membranes*, ACS Symposium Series 269, D.R. Lloyd, Ed., St. Louis, MO, Apr. 9–11, 1984.

*Primary Examiner*—Joseph W. Drodge

[57] ABSTRACT

This invention relates to methods for preparing membranes of polyfluoroethylene (PTFE) and to the asymmetric membranes fabricated thereby. Such membranes are useful as separation and ultrafiltration membranes. The membranes are produced as a single layer. Method steps including contacting a substrate with a solution of PTFE in a perfluorinated cycloalkane solvent at a high temperature to cause a film of such solution to be coated on the substrate, removing the coated substrate from the solution and rapidly cooling it by contact with a second solvent, removing the coated substrate from the second solvent, drying the film, and optionally separating film from substrate.

12 Claims, No Drawings

5,653,882

ASYMMETRIC MEMBRANES OF POLYTETRAFLUOROETHYLENE AND PROCESS FOR MAKING THEM

This is a continuation in part of application Ser. No. 08/093,233 filed Jul. 16, 1993, now abandoned.

FIELD OF THE INVENTION

This invention relates to membranes of polytetrafluoroethylene (PTFE) and their preparation.

TECHNICAL BACKGROUND

There is much literature available concerning the production and uses of synthetic membranes. See, for example, Kesting, R. E., Synthetic Polymeric Membranes Structural Perspective, 2d Ed., John Wiley and Sons, Inc., New York, 1985, Porter, M. C., Ed. Handbook of Industrial Membrane Technology, Noyes Publications, 1990, Chapter 1, "Membranes and Their Preparation", (chapter by Heiner Strathmann), 1990, and D. R. Lloyd, ed., Materials Science of Synthetic Membranes, American Chemical Society, Washington, D.C., 1985.

As discussed in detail in those references and elsewhere, membranes prepared from synthetic polymers may be porous (i.e., void-containing) or dense, symmetric or asymmetric. Symmetric membranes exhibit essentially homogeneous morphology from one surface to the other whereas asymmetric membranes exhibit a morphology which varies continuously from one surface to the other. Each type of membrane is optimal for particular applications.

A very important general method for the production of membranes from various synthetic polymers is the so-called phase inversion process in which a single-phase polymer solution is subject to a condition under which a polymer rich phase is separated to form a membrane like structure. The phase inversion process is particularly useful for forming very fine pore symmetric membranes, as well as asymmetric membranes. Control over the conditions under which the phase separation occurs allows the pore structure to be tailored to particular needs. Asymmetric membranes, having a very finely porous or dense polymeric skin on an otherwise "open" membrane structure, offer high membrane selectivity coupled with high permeate transport rates.

One particular form of the phase inversion process is the so-called thermal phase inversion process developed by Castro (U.S. Pat. No. 4,247,498). In this process, a polymer solution is formed in a solvent at a temperature above the lower critical solution temperature, the resulting solution is then, e.g., cast onto a substrate or spun into a fiber under conditions in which the temperature of the solution is reduced to a point at which is formed a polymer rich phase from which the final membrane morphology is derived. The solution concentration, rate of cooling, and method of final quenching all influence the final morphology.

As a general rule, polymer solutions suitable for use in the thermal phase inversion process contain at least 20% polymer (see Chapter 10 of Materials Science of Synthetic Membranes, above, and temperatures have been below 200° C.).

One particularly useful synthetic resin from which phase inversion membranes have not heretofore been made is polytetrafluoroethylene (PTFE). The absence of any known solvent for PTFE precluded any attempt in the direction of fabricating PTFE membranes by the phase inversion process. Thus, there are also no examples of true asymmetric membranes of PTFE. Other methods for fabricating symmetric membranes of PTFE, primarily so-called microporous PTFE, have been developed which are capable of creating PTFE membranes of relatively limited morphological scope. Notable among these are Gore-Tex microporous PTFE manufactured by W. L. Gore and Associates, Elkton, Md. (U.S. Pat. No. 3,664,915, U.S. Pat. No. 3,953,566, U.S. Pat. No. 3,962,153, 4,187,390). Gore-Tex exhibits a highly fibrillar morphology.

U.S. Pat. No. 4,248,924 discloses a porous asymmetric PTFE film wherein the asymmetry is produced by compression and a temperature gradient. The resultant morphology is highly fibrillated.

U.S. Pat. No. 4,863,604 discloses an asymmetric laminated sheeting structure in which each successive lamina exhibits a different pore size. This laminar structure is quite different from the structure of a typical, single layer asymmetric membrane produced by the phase inversion process in which pore size is observed to vary continuously from one surface to the other. Further, it is known in the art that PTFE is extremely difficult to form into laminates, and such laminates are highly susceptible to undesirable peeling and separation while in use. Because of the single layer structure of asymmetric membranes, they are not subject to peeling and separation of layers since there is only one, albeit inhomogeneous, layer.

U.S. Pat. No. 4,889,626 discloses an asymmetric tubular membrane made using PTFE and fluoropolymer alloys. The resulting membrane has a highly fibrillar morphology.

Other composite PTFE structures are known. R. West et al., Proc.-Inst. Environ., Sci., Performance of New Dual Asymmetric PTFE Membrane 37th (1991). The filter is characterized by having three layers, a thin inner layer of fine pores with layers above and below it having relatively larger pores.

F. Vego et al., Journal of Applied Polymer Science, Vol. 21, 3269-3290 (1977) disclose the preparation of asymmetric PTFE membranes using sintering of PTFE emulsions in the presence of salts. The porous supports formed were then deposited on a dense file of PTFE.

In order to fully realize the potential of the chemically inert, high temperature resistant PTFE in membrane applications, it is highly desirable to discover a phase inversion process for producing PTFE membranes, both symmetric and asymmetric in a single layer of pure PTFE.

Recently it has been discovered that perfluorinated cycloalkanes such as perfluorotetradecahydrophenanthrene and mixtures of oligomers formed therefrom can be employed at temperatures of ca. 300° C. or higher to form solutions of PTFE. (U.S. Pat. No. 5,328,946). An attempt was therefore undertaken by applicants to fabricate PTFE membranes by the thermal phase inversion process, and in particular to fabricate asymmetric PTFE membranes characterized by a single continuous layer and a spherical particle morphology.

SUMMARY OF THE INVENTION

This invention comprises a process for making membranes of PTFE. This invention further comprises single-layer asymmetric PTFE membranes characterized by a substantially non-fibrillar particle morphology and are further characterized by one surface being substantially free of pores or having pores no greater than about 0.1 microns in diameter, and by a second surface having numerous pores greater than or equal to about 0.1 micron, preferably greater than 1 micron, in diameter. This invention further comprises a process for making asymmetric PTFE membranes.

The process of this invention comprises:

(a) contacting a substrate with a solution of PTFE having molecular weight of at least 1 million, in a perfluorinated cycloalkane solvent having a critical temperature of at least 340° C., said solution being at a temperature about 300° C. to about 360° C., thereby coating a film of said solution to be coated onto said substrate;

(b) removing the coated substrate from the hot solution;

(c) removing the solvent from said coated substrate and allowing the PTFE to cool and coalesce on the substrate and, optionally, (d) separating the coalesced film from the substrate.

The present invention further comprises a process for making single-layer asymmetric PTFE membranes characterized by a substantially non-fibrillar morphology and are further characterized by one surface being substantially free of pores or having pores no greater than about 0.1 microns in diameter, and by a second surface having numerous pores greater than or equal to about 0.1 micron, preferably greater than micron, in diameter, which process comprises:

(a) contacting a substrate with a solution of PTFE having molecular weight of at least 1 million, in a perfluorinated cycloalkane solvent having a critical temperature of at least 340° C., said solution being at a temperature about 300° C. to about 360° C., thereby coating a film of said solution to be coated onto said substrate;

(b) removing the coated substrate from the hot solution;

(c) removing the solvent from said coated substrate and allowing the PTFE to cool and coalesce on the substrate so that the one surface is less porous and the opposite surface is more porous; and, optionally, (d) separating the coalesced film from the substrate.

The PTFE solution is preferably heated to about 340° C. In step (c) the solvent can be removed by evaporation, or by addition of a second "solvent" (called hereinafter "non-solvent") that selectively dissolves the solvent and can be washed away, but will not dissolve the PTFE. The non-solvent may also be introduced as a solvent/non-solvent mixture. The non-solvent may also be added in step (a).

DETAILS OF THE INVENTION

In the present process, as-polymerized PTFE and melt-recrystallized PTFE are equally suitable starting materials. These may be in the form of particles or shaped articles such as film, sheet, fiber, rod or billet. To make the solution, the PTFE is contacted with an excess of solvent which dissolves the PTFE when the mixture is heated to at least about 300° C. to about 360° C., preferably about 340° C., at ambient atmospheric pressure. The starting PTFE may be immersed in unheated solvent and then heated to the operating temperature, or immersed in the solvent which has been previously heated to the operating temperature.

Suitable solvents for PTFE herein are perfluorinated cycloalkanes, as described in co-pending Ser. No. 07/936,449, which is incorporated herein by reference in its entirety. By perfluorinated cycloalkanes are meant saturated cyclic compounds, which may contain fused or unfused rings. In addition, the perfluorinated cycloalkane may be substituted by perfluoroalkyl and perfluoroalkylene groups. By perfluoroalkyl group is meant a saturated branched or linear carbon chain. By perfluoroalkylene group is meant an alkylene group which is branched or linear and is bound to two different carbon atoms in carbocyclic rings. The total number of carbon atoms in all of the perfluoroalkyl and perfluoroalkylene groups in a molecule of the solvent must be less than the total number of carbon atoms in the carbocyclic rings of a solvent molecule. It is preferred if there are at least twice as many carbon atoms in the rings of the solvent molecule as there are atoms in the perfluoroalkyl and perfluoroalkylene groups.

In order to insure that the solvent will actually dissolve the polymer (PTFE), the critical temperature of the solvent should be 340° C. or higher, preferably about 360° C. or higher. Critical temperatures of many compounds can be found in standard references, and may be measured by methods known to those skilled in the art. The process of dissolving the polymer is carried out under autogenous pressure at the temperature required to dissolve the polymer or at atmospheric pressure, whichever is greater. By autogenous pressure is meant the sum of the vapor pressures of the constituents of the process at the process temperature. Stirring or other forms of agitation will increase the rate of dissolution of the polymer.

Compounds useful as solvents herein include, but are not limited to, perfluoro(tetradecahydrophenanthrene), perfluorodimer and perfluoro[(cyclohexylmethyl)decalin]. Preferred solvents are perfluoro(tetradecahydrophenanthrene), and perfluoro[(cyclohexylmethyl)decalin]. Another preferred solvent is perfluorodimer. By "perfluorodimer" herein is meant a byproduct from the fluorination of phenanthrene using a combination of $CoF_3$ and fluorine, as described in British Patent 1,281,822, which is incorporated herein by reference.

When phenanthrene is thus fluorinated to perfluorotetradecahydrophenanthrene, a higher boiling fraction is obtained upon fractional distillation of the crude liquid product. This fraction has a boiling range of 280° C. to about 400° C. at atmospheric pressure, typically about 320°–340° C. It has a small amount of olefin and a very small amount of hydrogen in it, both of which can be further reduced by postfluorination. It is believed that most of this mixture consists of the general structure

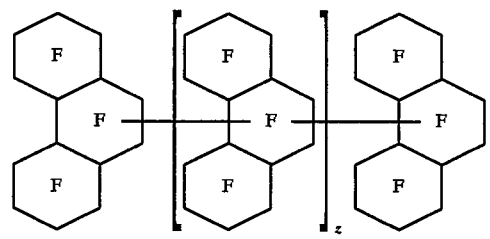

wherein z is 0, 1 or 2. Also believed to be present in smaller quantities are compounds from ring fusion and/or ring opening of the above compounds or their precursors such as

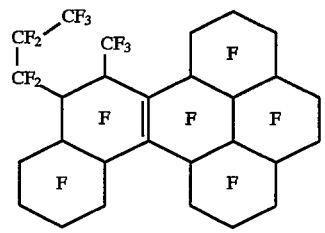

from the compound where z is 0 (it is not possible to say with assurance that this particular isomer is in the mixture— it is merely illustrative of one possible structure consistent with the analytical data and the synthetic method). Similar fused structures from the compounds where z is 1 or 2 are also believed to be present. Although traces of hydrogen are present, the location has not been determined. The term "perfluorodimer" is used throughout this Application to describe this material.

The PTFE used in the present process is any type of fully polymerized, high molecular weight, crystalline or partly crystalline compound. The PTFE may be in any form; for example granular, fine powder, or fabricated into shaped articles. By "fine powder" is meant a coagulated and dried PTFE product of emulsion or dispersion polymerization. By "granular" is meant a product of suspension polymerization which may optionally be milled. By "PTFE" is meant polytetrafluoroethylene homopolymer and copolymers of polytetrafluoroethylene, which may contain minor amounts of repeat units of other monomers.

Substrates may be coated by contacting, as by dipping, the substrate into a solution of the polymer, removing the excess solution, if any, by allowing it to flow off and then removing the solvent, as by heating (e.g., in a drying oven) or using a non-solvent.

The choice of solvent(s) and any additives used may influence the final membrane structure, as does the rate of cooling, evaporation or any non-solvent addition to the solution e.g., for removal of excess solvent. The various additives and conditions for cooling and evaporation would be known to those skilled in the membrane art. Thus, one will usually use a starting solution whose composition or temperature is near the point of phase separation (into either two liquid phases or a liquid and a solid phase), with additives being chosen to adjust both the starting thermodynamic state and/or the rates of membrane formation.

For most membrane polymers, having membranes produced by coating a dissolved material on a solid substrate, lower solution concentrations lead to structures with "fingered" pores which may be unacceptable for certain uses. Higher concentrations (e.g., 15–30%) usually lead to "spongy" structures. For PTFE, it is preferred if the solution concentration is at least about 2–3%, which gives acceptable membrane morphology. For membranes cast as films on liquids, as disclosed in U.S. Pat. No. 4,374,891, low concentrations can yield acceptable membrane layers.

It is known in the art of forming membranes by thermal phase inversion that the rate of membrane cooling and the temperature of the substrate onto which the solution is cast both have great significance in the morphology of the final membrane. A rapid rate of cooling generally leads to a more porous product than does a slower rate of cooling which however generally yield finer pores. Similarly, as the temperature of the substrate surface is reduced with respect to that of the polymer solution, the membrane formed thereon tends to form a skin layer. Thus a symmetric membrane can be formed from the same solution as an asymmetric membrane depending upon the surface temperature of the substrate. In the case of PTFE, all these considerations apply, but all of these considerations must be shifted to higher temperatures and more dilute solutions than are taught in the art. Thus, it is found desirable to preheat substrates to ca. 250°–300° C. before contacting with a solution at ca. 340° C. in order to retard the phase inversion long enough for a film to be formed on the substrate surface.

In the PTFE membranes known in the art which exhibit a fibrillar morphology, the fibrils typically exhibit a length to thickness ratio of about 10:1 or greater. For the purposes of this invention, the term "non-fibrillar" is taken to mean of a length to thickness ratio of less than about 10:1, preferably less than 5:1. In the asymmetric membranes of this invention, the polymer particles exhibit a non-fibrillar morphology. In a preferred embodiment of this invention the polymer particles are of a generally spherical morphology.

The membrane may be removed from the substrate by any convenient means such as peeling. Care must be taken upon removing the membrane of this invention from the substrate upon which it has been cast or deposited in order to minimize both tearing of the membrane and fibrillation of the PTFE polymer particles, and thus disruption of the microstructure of the membrane of this invention. It should be understood for the practice of this invention that the presence of some number of fibrillated particles may not in itself constitute a departure from the membrane of this invention. However, the percentage of particles so fibrillated may not be greater than 50% by number, preferably less than 10% by number, and most preferably less than 1% by number.

Substrates that may be used in the process include, but are not limited to, aluminum, glass or stainless steel plates.

Because of the known potential for evolution of noxious or toxic substances from fluorinated materials heated to the temperature taught herein, proper ventilation and, where needed, environmental safeguards (e.g., scrubbers) should be in place before performing the processes of this invention.

The invention is further illustrated with reference to the following examples in which temperatures are expressed in degrees Celsius and percentages are by weight unless otherwise indicated.

EXAMPLE 1

60 g of Teflon® MP1500, available from E. I. du Pont de Nemours and Company, Wilmington, Del. 19880, was dissolved in 2940 g of perfluorodimer. The addition of the Teflon® to the oligomer was carried out in a glass resin kettle. The perfluorodimer was first added to the kettle. The Teflon® was added incrementally over a period of 5 days while the kettle contents were maintained at temperatures ranging from 310° to 330° C. The material was maintained at temperature for an additional 3 days with occasional scraping of the kettle sides and stirrer. Agitation was maintained throughout the 8 days except while scraping. This resulted in a uniform appearing solution of 2% MP1500.

The solution was then cooled to ambient temperature and later reheated for transfer to a heated box made of high nickel alloy metal, the interior dimensions of said box being 7"×1"×12"h.

The solution was heated to 320° C. and held without agitation for 1.5 hours. After that period, a polished aluminum plate which had been pre-heated in an oven to 250° C. was removed from the oven and quickly immersed in the 320° C. solution, and held for several minutes (ca. 5). Upon removal of the plate, it was found to be heavily coated with a thick and uneven coating. The plate was allowed to cool in the air for several minutes, and then immersed in F113 for a couple of hours, after which it was removed and air-dried.

An uneven coating was observed on the plate, a large portion of which was very bright white. A portion of the white coating was removed by scraping with a new single-edge razor blade. The coating peeled off quite readily with no sense of being pulled or stretched. The film so produced ranged in thickness from ca 100 μm to ca. 400 μm.

Scanning electron micrography revealed that the opposing surfaces of the film were quite different in morphology, one surface being smooth and almost featureless, containing a few relatively large holes as defects. The opposite surface consisted of extensive areas containing numerous holes ranging in size from a couple of microns to submicron size.

EXAMPLE 2

A second specimen from the same plate revealed a surface which resembled a foam structure, containing a large number of pores less than 0.1 μm in diameter.

EXAMPLE 3

In a second experiment, a similarly pre-heated polished stainless steel plate was immersed in the solution used in Example 1 at 335° C. for five minutes. Upon removal, the coating appeared to be much more uniform than it had been on the aluminum plate. This plate, too, was air cooled, then immersed in Freon®-113 (B.P. 45.8° C.) for a couple of hours.

The resultant plate also showed extensive areas of white coating, but not as extensive as in the case of the aluminum plate. The film was considerably more difficult to peel off. SEM revealed a somewhat porous surface containing large, gaping holes, submicron fissures, and a great deal of fibrillation. There appeared to be some evidence of porosity but it was less pronounced and less well-defined than in the aluminum plate case.

What is claimed is:

1. A process for making a single-layer asymmetric membrane comprising:
    (a) contacting a substrate with a solution of PTFE having a molecular weight of at least 1 million in a perfluorinated cycloalkane solvent, having a critical temperature of at least about 340° C., said solution formed by immersing PTFE in said solvent, the solution temperature being about 300° C. to about 360° C., thereby causing a film of said solution to be coated on said substrate;
    (b) removing the coated substrate from the hot solution;
    (c) rapidly cooling the substrate and removing the solvent from the coating thereon deposited by contacting the coating at a temperature less than 150° C. with an excess of a second solvent which dissolves the perfluorinated cycloalkane; (d) removing the coated substrate from the excess of the second solvent and drying the film at a temperature below the boiling point of the second solvent; and,
    (e) separating the dried film from the substrate.

2. The process of claim 1 wherein the solvent of step (a) is perfluorodimer.

3. The process of claim 1 wherein, in step (d), the film is separated from the substrate by peeling the film from said substrate.

4. The process of claim 1 wherein step (a) is carried out at 340° C.

5. The process of claim 1 wherein, in step (a), PTFE is immersed in unheated solvent and then heated to the solution temperature.

6. The process of claim 1 wherein, in step (a), PTFE is immersed in the solvent after the solvent has been previously heated to the solution temperature.

7. The product of the process of claim 1.

8. A process for making a single-layer asymmetric membrane comprising:
    (a) contacting a substrate with a solution of PTFE having a molecular weight of at least 1 million in a perfluorinated cycloalkane solvent, having a critical temperature of at least about 340° C., said solution formed by immersing PTFE in said solvent, the solution temperature being about 300° C. to about 360° C., thereby causing a film of said solution to be coated on said substrate;
    (b) removing the coated substrate from the hot solution;
    (c) rapidly cooling the substrate and removing the solvent from the coating thereon deposited by contacting the coating at a temperature less than 150° C. with an excess of a second solvent which dissolves the perfluorinated cycloalkane; and,
    (d) removing the coated substrate from the excess of the second solvent and drying the film at a temperature below the boiling point of the second solvent.

9. The process of claim 8 wherein step (a) is carried out at 340° C.

10. The process of claim 8 wherein, in step (a), PTFE is immersed in unheated solvent and then heated to the solution temperature.

11. The process of claim 8 wherein, in step (a), PTFE is immersed in the solvent after the solvent has been previously heated to the solution temperature.

12. The product of the process of claim 8.

* * * * *